Figure 1:
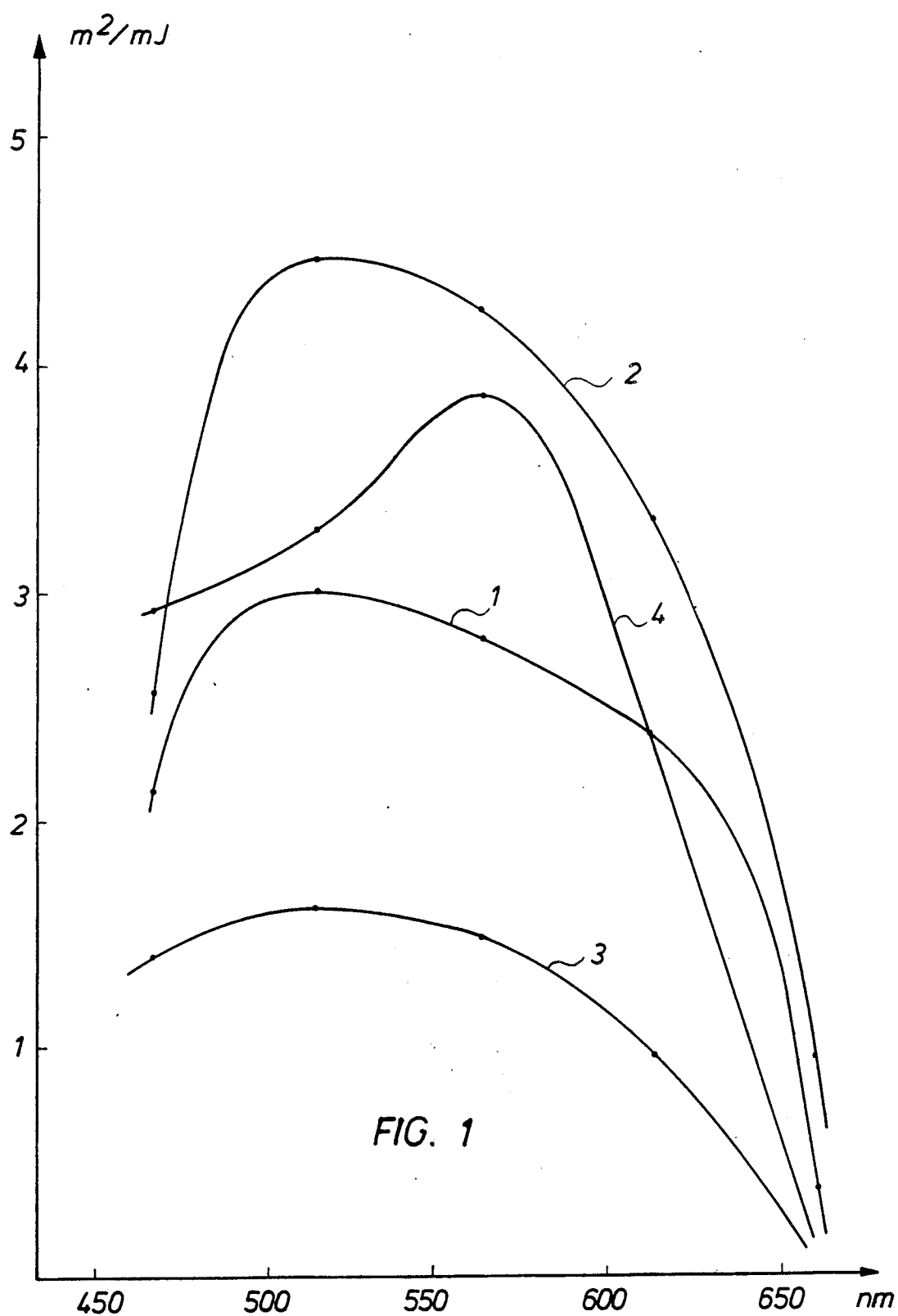

United States Patent [19]

Terrell et al.

[11] Patent Number: 4,990,421
[45] Date of Patent: Feb. 5, 1991

[54] ELECTROPHOTOGRAPHIC RECORDING MATERIAL CONTAINING A TRISAZO DYE

[75] Inventors: David R. Terrell, Lint; Marcel J. Monbaliu, Mortsel; Carina Geelen; Guy P. Verbeek, both of Leuven; Frans C. De Schrijver, Linden; Mark G. Van der Auweraer, Leuven, all of Belgium

[73] Assignee: AGFA-GEVAERT, N.V., Mortsel, Belgium

[21] Appl. No.: 380,034

[22] Filed: Jul. 14, 1989

[30] Foreign Application Priority Data

Jul. 14, 1988 [EP] European Pat. Off. ........ 88201507.6

[51] Int. Cl.$^5$ .................. G03G 5/047; G03G 5/06
[52] U.S. Cl. .................................. 430/58; 430/72; 430/78; 430/79; 534/754; 534/796; 534/809
[58] Field of Search ................. 430/58, 72, 78, 79

[56] References Cited

U.S. PATENT DOCUMENTS

| 4,426,432 | 1/1984 | Sawada et al. ............ 430/72 X |
| 4,427,753 | 1/1984 | Fumimura et al. ........ 430/72 X |
| 4,433,039 | 2/1984 | Miyakawa et al. ........ 430/72 X |
| 4,687,721 | 8/1987 | Emoto et al. ............ 430/79 X |

Primary Examiner—Roland Martin
Attorney, Agent, or Firm—A. W. Breiner

[57] ABSTRACT

An electrophotographic recording material comprising a conductive support and a photosensitive layer containing a photoconductive compound that has p-type charge generating capacity and is a trisazo compound which is the reaction product of the coupling reaction between a coupler compound that does not contain a carboxylic acid or sulphonic acid group and a diazonium salt represented by the following general formula (I):

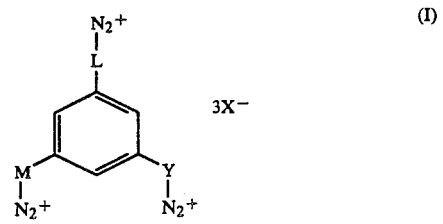

wherein: each of L, M and Y (same or different) represents a phenylene group including a phenylene groups substituted with one or more substituents selected from the group consisting of lower alkyl ($C_1$–$C_2$), nitro, methoxy, ethoxy or halogen, or represents said phenylene group fused-on with the necessary atoms to close a saturated or unsaturated carbocyclic or heterocyclic ring or ring system including said ring or ring-system in substituted form, and $X^-$ is an anion.

11 Claims, 1 Drawing Sheet

ELECTROPHOTOGRAPHIC RECORDING MATERIAL CONTAINING A TRISAZO DYE

DESCRIPTION

The present invention relates to a photosensitive recording material suited for use in electrophotography.

In electrophotography photoconductive materials are used to form a latent electrostatic charge image that is developable with finely divided colouring material, called toner.

The developed image can then be permanently affixed to the photoconductive recording material, e.g. photoconductive zinc oxide-binder layer, or transferred from the photoconductor layer, e.g. selenium layer, onto a receptor material, e.g. plain paper and fixed thereon. In electrophotographic copying and printing systems with toner transfer to a receptor material the photoconductive recording material is reusable. In order to permit a rapid multiple printing or copying a photoconductor layer has to be used that rapidly looses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

Another important property which determines whether or not a particular photoconductive material is suited for electrophotographic copying is its photosensitivity that must be high enough for use in copying apparatus operating with a copying light source of fairly low intensity.

Commercial usefulness further requires that the photoconductive layer has a chromatic sensitivity that matches the wavelength(s) of the light of the light source, e.g. laser, or has panchromatic sensitivity to allow the reproduction of all colours in balance.

Intensive efforts have been made to satisfy said requirements, e.g. the spectral sensitivity of selenium has been extended to the longer wavelengths of the visible spectrum by making alloys of selenium, tellurium and arsenic. In fact selenium-based photoconductors remained for a long time the only really useful photoconductors although many organic photoconductors were discovered.

Organic photoconductor layers of which poly(N-vinylcarbazole) layers have been the most useful were less interesting because of lack of speed, insufficient spectral sensitivity and rather large fatigue.

However, the discovery that 2,4,7-trinitro-9-fluorenone (TNF) in poly(N-vinylcarbazole) (PVCz) formed a charge-transfer complex strongly improving the photosensitivity (ref. U.S. Pat. No. 3,484,237) has opened the way for the use of organic photoconductors in copying machines that could compete with the selenium-based machines.

TNF acts as an electron acceptor whereas PVCz serves as electron donor. Films consisting of said charge transfer complex with TNF:PVCz in 1.1 molar ratio are dark brown, nearly black and exhibit high charge acceptance and low dark decay rates. Overall photosensitivity is comparable to that of amorphous selenium (ref. Schaffert, R. M. IBM J. Res. Develop., 15, 75 (1971).

A further search led to the discovery of phthalocyanine-binder layers, using poly(N-vinylcarbazole) as the binder [ref. Hackett, C. F., J. Chem. Phys., 55, 3178 (1971)]. The phthalocyanine was used in the metal-free X form and according to one embodiment applied in a multilayer structure wherein a thin layer of said phthalocyanine was overcoated with a PVCz layer. Hackett found that photoconductivity was due to field dependent photogeneration of electron-hole pairs in the phthalocyanine and hole injection into the PVCz. The transport of the hole carriers, i.e. positive hole conduction proceeded easily in the PVCz layer. From that time on much research has been devoted to developing improved photoconductive systems wherein charge generation and charge transport materials are separate in two contiguous layers (see e.g. U.K. Pat. No. 1,577,859). The charge generating layer may be applied underneath or on top of the charge transport layer. For practical reasons, such as less sensitivity to wear and ease of manufacture, the first mentioned arrangement is preferred wherein the charge generating layer is sandwiched between a conductive support and a light transparent charge transport layer as describd e.g. by Wolfgang Wiedemann, in the article titled "Organische Photoleiter —Ein Uberblick, II", published in Chemiker Zeitung, 106. (1982) Nr. 9 p. 315.

In order to form a photoconductive two layer-system with high photosensitivity to the incident light efficient charge generating substances are required that operate in conjunction with efficient charge transport substances.

Various organic dyes and pigments have been proposed as charge generating substances.

Most of the organic dyes or pigments of the charge generating layer provide more efficient hole injection than electron injection across a field-lowered barrier at the interface where pigment-dye/charge transport compounds touch each other and a charge transfer complex compound is possibly formed.

Efficient p-type charge transport compounds can be found in the group consisting of heteroaromtic or unsaturated heterocyclic amino compounds, hydrazone compounds, triphenylmethane and triarylamino derivatives.

Examples of double layer systems containing heteroaromatic compounds or amino-substituted unsaturated heterocyclic compounds as charge transporting substances are described in DE-O 2 237 539, U.S. Pat. No. 3,837,851 and in our co-pending European patent applications Nos. 88201293.3, 88201292.5 and 88201332.9.

Examples of hydrazone compounds as charge transporting substances are described in U.S. Pat. No. 4,278,747 and 4,365,014.

Examples of triphenylmethane derivatives that are useful as charge transporting compounds in a double layer photoconductive system are given in U.S. Pat. No. 4,050,935, 4,140,529 and 4,330,608.

Examples of triarylamine derivatives that are useful as charge transporting compounds in a double layer photoconductive system are given in U.S. Pat. No. 4,265,990.

Useful charge generating substances belong to one of the following classes:
(a) perylimides, e.g. C.I. 71 130 (C.I. =Colour Index) described in DBP 2 237 539, (b) polynuclear quinones, e.g. anthanthrones such as C.I. 59 300 described in DBP 2 237 678, (c) quinacridones, e.g. C.I. 46 500 described in DBP 2 237 679, (d) naphthalene 1,4,5,8-tetracarboxylic acid derived pigments including the perinones, e.g. Orange GR, C.I. 71 105 described in DBP 2 239 923, (e) phthalocyanines, e.g. $H_2$-phthalocyanine in X-crystal form (X-$H_2$Ph), metal phthalocyanines, e.g. Copper phthalocyanine C.I. 74 160 described in DBP 2 239 924 and indium phthalocyanine described in U.S. Pat. No. 4,713,312, (f) indigo-and thioindigo dyes, e.g. Pigment Red 88, C.I. 73 312 described in DBP No. 2 237 680, (g) benzothioxanthene-derivatives as described e.g. in DAS No. 2 355 075, (h) perylene 3,4,9,10-tetracarboxylic acid derived pigments including condensation products with o-diamines as described e.g. in DAS No. 2 314 051, (i) Polyazo dyes or pigments, e.g. Chlordiane Blue C.I. 21 180 described in DAS No. 2 635 887, and bisazo pigments described in DOS No. 2 919 791, DOS No. 3 026 653 and DOS No. 3 032 117 and U.S. Pat. No. 4,123,270, and, (j) squarilium dyes as described e.g. in DAS No. 2 401 220, (k) polymethine dyes.

(l) triarylmethane dyes, and (m) dyes containing 1,5 diamino-anthraquinone groups.

Charge generating dyes and pigments not only have to fulfill the requirement of a high charge generating capacity inthe spectral range of practicallly useful exposure sources such as incandescent light bulbs, fluorescent light tubes and lasers, but have to maintain that property for repetitive use without unacceptable deterioration in characteristics.

A search is still going on to find charge generating substances that optimally combine light-sensitivity without deterioration with high charge generating capacity and low residual potential after exposure. The class of azo dyes contains a large variety of charge generating substances exhibiting a high light absorption power and charge generating capacity. Preference is give to azo compounds such as trisazo compounds representatives of which are described in U.S. Pat. No. 4,687,721 and 4,735,882.

It is an object of the present invention to provide an electrophotographic recording material comprising a conductive support and a photosensitive layer containing a photoconductive trisazo compound that has high charge generating properties.

It is a further object of the present invention to provide a photoconductive recording material comprising a conductive support and a charge transport layer in contiguous relationship with a charge generating layer containing a photoconductive trisazo dye pigment having a high positive hole generating capacity, i.e. high p-type charge generating capacity, combined with a good durability in repetitive use.

It is another object of the present invention to provide a recording process wherein a charge pattern of negative charge is formed on said photoconductive composite layer recording material by negatively charging its charge transport layer and imagewise photo-exposing said charge generating layer containing a photoconductive trisazo compound.

Other objects and advantages of the present invention will appear from the further description and examples.

In accordance with the present invention an electrophotographic recording material is provided comprising a conductive support and a photosensitive layer containing a photoconductive compound that has p-type charge generating capacity and is a trisazo compound which is the reaction product of the coupling reaction between a coupler compound that does not contain a carboxylic acid or sulphonic acid group and a diazonium salt represented by the following general formula (I):

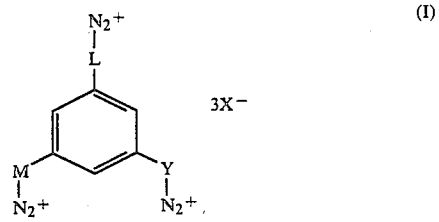

wherein: each of L, M and Y (same or different) represents a phenylene group including a phenylene group substituted with one or more substituents selected from the group consisting of lower alkyl ($C_1$–$C_2$), nitro, methoxy, ethoxy or halogen, or represents said phenylene group fused-on with the necessary atoms to close a saturated or unsaturated carbocyclic or heterocyclic ring or ring system including said ring or ring-system in substituted form, and $X^-$ is an anion.

In a preferred embodiment according to the present invention an electrophotographic recording material is provided which comprises an electrically conductive support having thereon a charge generating layer in contiguous relationship with a charge transporting layer, characterized in that said charge generating layer contains a trisazo compound which is the reaction product of the coupling reaction for azo dye formation between a coupler compound that does not contain a carboxylic acid or sulfonic acid group and a diazonium salt represented by the above general formula (I).

Diazonium salts according to general formula (I) have been previously reported by H. Uebersax in 1949 in Ph.D. thesis from the Eidgenössischen Technischen Hochscule in Zürich and in 1962 by Athanasios Ghertos in his Ph.D. thesis at the same institute in Zürich. These salts were used for coupling with couplers such as acetyl H-acid, G-acid, J-acid and phenyl-J-acid for dyeing applications by Uebersax and some of these syntheses were repeated and additional syntheses carried out with Chicago acid, J-acid, gamma-acid, naphthionic acid, 1-phenyl-3-methyl-5-pyrazolone-4-sulfonic acid and Schäffer acid by Ghertsos with evaluation for cotton and wool dyeing. The structure of the above mentioned couplers is known to those skilled in the art and is described e.g. by Louis F. Fieser and Mary Fieser in Organic Chemistry, 3rd. ed. (1956), Chapman & Hall, Ltd., London, p. 746-751. Furthermore Ghertsos produced trisazo pigments by coupling such diazonium salts with 1-phenyl-3-methyl-5-pyrazolone and NAPHTOL AS (registered trade mark of Hoechst AG, W.-Germany). For the structure of last mentioned coupler compound, see also the above mentioned book entitled "Organic Chemistry", p. 929-930.

Among preferred couplers used in the production of trisazo dyes applied in a recording material according to the present invention are those represented by one of the following general formulae (II), (III), (IV), (V) and (VI):

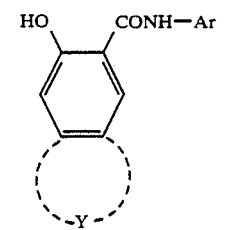  (II)

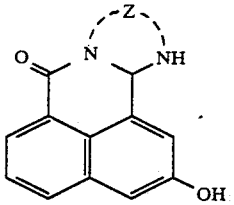  (III)

or

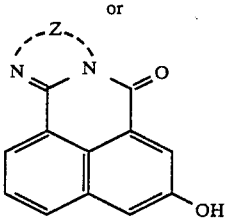

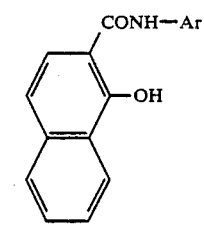  (IV)

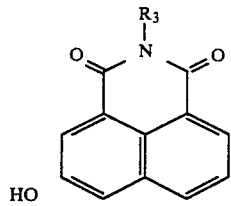  (V)

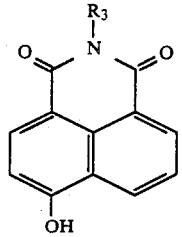  (VI)

wherein:

Y represents the necessary atoms to close an aromatic carbo- or heterocyclic ring or ring system including said ring or ring system in substituted form, Ar represents a phenyl group including a phenyl group further substituted with one or more substituents selected from the group consisting of lower alkyl ($C_1$-$C_2$), nitro, methoxy, ethoxy or halogen, or represents said phenyl group fused-on with the necessary atoms to close a saturated or unsaturated carbocyclic or heterocyclic ring or ring system including said ring or ring system in substituted form, Z represents the necessary atoms to close a heterocyclic ring or ring system including said ring or ring system in substituted form, and $R^3$ is an alkyl, aralkyl or aryl group.

Specific examples of 1,3,5-tris(azophenyl)benzene dyes suitable for use according to the present invention are listed in the following Table.

TABLE

| Trisazo dye | Diazonium salt | Coupler |
|---|---|---|
| 1. | ![structure] | ![structure] |
| 2. | ![structure] | ![structure] |

| Trisazo dye | Diazonium salt | Coupler |
|---|---|---|
| 3. | 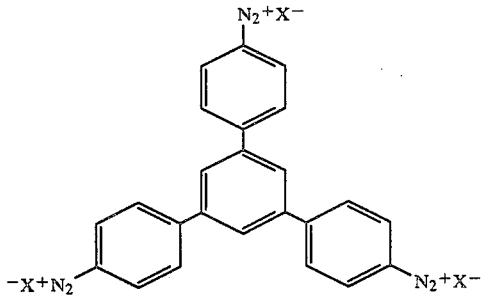 | 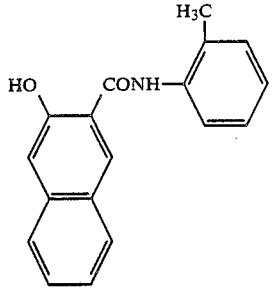 |
| 4. | 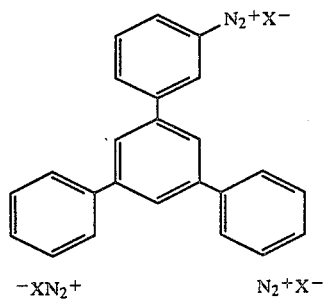 | 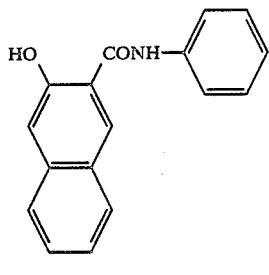 |
| 5. | 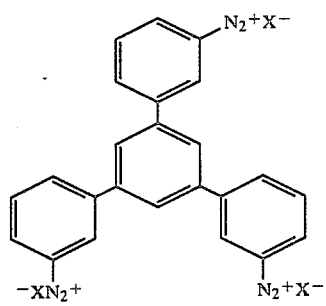 | 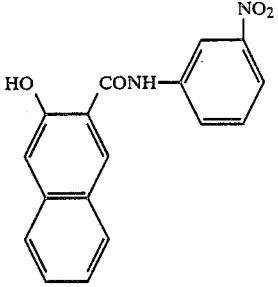 |
| 6. | 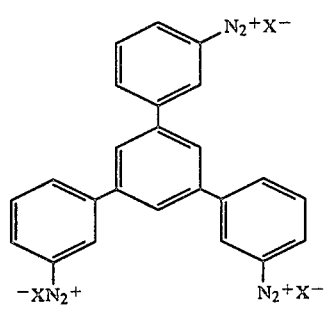 | 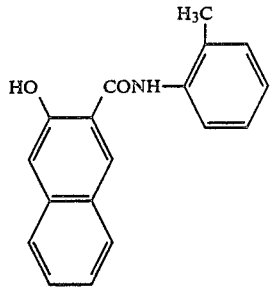 |
| 7. | 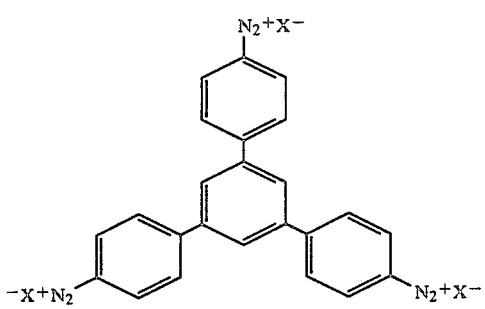 | 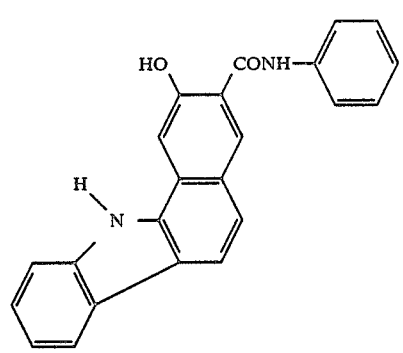 |

| Trisazo dye | Diazonium salt | Coupler |
|---|---|---|
| 8. | (triphenylbenzene tris-diazonium salt, para) | 3-hydroxy-N-(4-methoxyphenyl)-4-(2-methylphenylamino)-... naphthamide |
| 9. | (triphenylbenzene tris-diazonium salt, para) | 3-hydroxy-N-(2-methylphenyl)-4-(2-methylphenylamino)-naphthamide |
| 10. | (triphenylbenzene tris-diazonium salt, para) | 3-hydroxy-N-(3-nitrophenyl)-4-(2-methylphenylamino)-naphthamide |
| 11. | (triphenylbenzene tris-diazonium salt, meta) | 3-hydroxy-N-phenyl-4-(2-methylphenylamino)-naphthamide |

| Trisazo dye | Diazonium salt | Coupler |
|---|---|---|
| 12. | 1,3,5-tris(3-diazoniumphenyl)benzene salt | 3-hydroxy-N-(4-methoxyphenyl)-8-(2-methylphenylamino)-6-(2-methylphenyl)-2-naphthamide |
| 13. | 1,3,5-tris(3-diazoniumphenyl)benzene salt | 3-hydroxy-N-(2-methylphenyl)-8-(2-methylphenylamino)-6-(2-methylphenyl)-2-naphthamide |
| 14. | 1,3,5-tris(3-diazoniumphenyl)benzene salt | 3-hydroxy-N-(3-nitrophenyl)-8-(2-methylphenylamino)-6-(2-methylphenyl)-2-naphthamide |

The preparation of the intermediate 1,3,5-tris(aminophenyl)benzenes can be accomplished by trimerizing appropriately substituted nitro, amino, acetylamine, bromo- or chloro-acetophenones with potassium pyrosulphate/sulfuric acid, hydrogen chloride or in the presence of aluminium catalysts. Trimerization yields as a major product 1,3,5-tris(nitrophenyl)-, 1,3,5-tris(acetylaminophenyl)-, 1,3,5-tris(chlorophenyl)- and 1,3,5-tris(bromophenyl)benzenes respectively. The 1,3,5-tris(nitrophenyl)benzenes and 1,3,5-tris(acetylaminophenyl)benzenes can be converted to the corresponding 1,3,5-tris(aminophenyl)benzenes by reduction with tin/-hydrochloric acid and alkaline hydrolysis respectively. The 1,3,5-tris(chlorophenyl)benzenes and 1,3,5-tris(-bromophenyl)benzenes can be converted into 1,3,5-tris-(aminophenyl)benzenes by reaction with ammonia under pressure.

1,3,5-Tris(aminophenyl)benzenes can be converted into substances according to general formula (I) by diazotization in a customary manner.

The coupling of compounds according to general formula (I) with a coupler according to one of the general formulae (II), (III), (IV) or (V) proceeds in a way known for azo dye formation.

Particular charge generation pigments used according to the present invention exhibit a photosensitivity in the rang of about 400 nm to about 650 nm as is shown in the diagram of accompanying FIG. 1, in which diagram the reciprocal of the absorbed light intensity in mJ/m2 is plotted against the wavelength in nm of the incident light from a monochromator. The measurement was carried out on a recording material containing as described in Example 1 a transport layer consisting of 50% wt. of 1,2-bis(1,2-dihydro-2,2,4-trimethyl-quinolin-1-yl) ethane in bisphenol A polycarbonate and charge generation layers consisting of 50 wt. % in said polycarbonate binder of the above mentioned trisazo dyes 1, 2, 3 and 4 corresponding respectively with the curves 1, 2, 3 and 4.

Other charge generation pigments with 2-oxy-[1,2]benzocarbazole-3-carboxylic acid anilides used according to the present invention exhibit photosensitivity in the range of about 400 nm to 680 nm.

For the production of a recording material according to the present invention at least one 1,3,5-tris(azophenyl)benzene pigment is applied in combination with a resin binder to form a charge generating layer adhering directly to a charge transporting layer, the two layers being supported by an electrically conductive substrate. The resin binders are selected on the basis of optimal mechanical strength, adhesion and favourable electrical properties.

Suitable electronically inactive binder resins for use in the charge transporting layer are e.g. cellulose esters, acrylte and methacrylate resins, cyanoacrylate resins, polyvinyl chloride, copolymers of vinyl chloride, e.g. a copolymer of vinyl chloride with vinyl acetate and maleic anhydride, polyester resins, e.g. copolyesters of isophthalic acid and terephthalic acid with glycol or aromatic polycarbonate resins.

A polyester resin particularly suited for use in combination with aromatic polycarbonate binders is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminium that may form a conductive coating on the support of the recording material.

Suitable aromatic polycarbonates can be prepared by methods such as those described by D. Freitag, U. Grigo, P. R. Müller and W. Nouvertné in the Encyclopedia of Polymer Science and Engineering, 2nd ed., Vol. II, pages 648–718, (1988) published by Wiley and Sons Inc., and have one or more repeating units within the scope of the following general formula (VII):

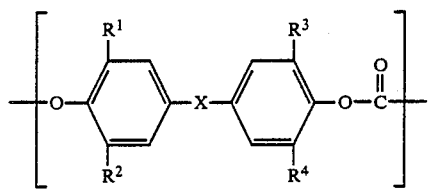

(VII)

wherein: X represents S, SO$_2$,

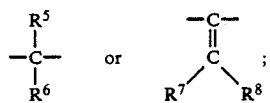

$R^1$, $R^2$, $R^3$, $R^4$, $R^7$ and $R^8$ each represents (same or different) hydrogen, halogen, an alkyl group or an aryl group, and $R^5$ and $R^6$ each represent (same or different) hydrogen, an alkyl group, an aryl group or together represent the necessary atoms to close a cycloaliphatic ring, e.g. cyclohexane ring.

Aromatic polycarbonates having a molecular weight in the range of 10,000 to 200,000 are preferred. Suitable polycarbonates having such a high molecular weight are sold under the registered trade mark MAKROLON of Farbenfabriken Bayer AG, W-Germany.

MAKROLON CD 2000 (registered trade mark) is a bisphenol A polycarbonate with molecular weight in the range of 12,000 to 25,000 wherein $R^1=R^2=R^3=R^4=H$, X is $R^5—C—R^6$ with $R^5=R^6=CH_3$.

MAKROLON 5700 (registered trade mark) is a bisphenol A polycarbonate with molecular weight in the range of 50,000 to 120,000 wherein $R^1=R^2=R^3=R^4=H$, X is $R^5—C—R^6$ with $R^5=R^6=CH_3$.

Bisphenol Z polycarbonate is an aromatic polycarbonate containing recurring units wherein $R^1=R^2=R^3=R^4=H$, X is $R^5—C—R^6$, and $R^5$ together with $R^6$ represents the necessary atoms to close a cyclohexane ring.

Further useful binder resins are silicone resins, polystyrene and copolymers of styrene and maleic anhydride and copolymers of butadiene and styrene.

An example of an electronically active resin binder is poly-N-vinylcarbazole or copolymers of N-vinylcarbazole having a N-vinylcarbazole content of at least 40% by weight.

The ratio wherein the charge generating 1,2,5-tris-(azophenyl) pigment and the resin binder are mixed can vary. However, relatively specific limits are imposed, e.g. to avoid flocculation. The content of the 1,2,5-tris-(azophenyl) pigment used according to the present invention in a charge generating layer is preferably in the range of 30 to 70% by weight with respect to the total weight of said layer. The charge generating layer is preferably less than 5 μm thick, more preferably is less than 2 μm thick.

In a preferred embodiment for the production of a recording material according to the present invention a charge transporting layer is coated on top of the charge generating layer. The thickness of the charge transport layer is preferably in the range of 5 to 50 μm, more preferably in the range of 5 to 30 μm.

The charge transporting layer may contain compounds substituted with electron-acceptor groups forming an intermolecular charge transfer complex with the charge transporting compound. Useful compounds having electron-accepting groups are nitrocellulose and aromatic nitro-compounds such as nitrated fluorenone-9 derivatives, nitrated 9-dicyanomethylenefluorenone derivatives, nitrated naphthalenes, chlorinated benzoquinones and nitrated naphthalic acid anhydrides or imide derivatives. The optimum concentration range of said derivatives is such that the molar donor/acceptor ratio is 10:1 to 1,000:1 and vice versa.

The presence of one or more spectral sensitizing agents can have an advantageous effect on the charge transport. In that connection reference is made to the sensitizing dyes described in U.S. Pat. No. 3,832,171 and 4,028,102. Preferably these dyes are used in an amount not substantially reducing the transparency in the visible light region (420–750 nm) of the charge transporting layer so that the charge generating layer still can receive a substantial amount of the exposure light when exposed through the charge transporting layer.

Compounds acting as stabilising agents against deterioration by ultra-violet radiation, so-called UV-stabilizers, may also be incorporated in said charge transport layer. Examples of UV-stabilizers are benztriazoles.

For controlling the viscosity of the coating compositions and controlling their optical clarity silicone oils may be added to the charge transporting layer.

As charge transport compounds for use in a recording material according to the present invention any of the known charge transport compounds mentioned hereinbefore may be used. Particularly good results are obtained with the charge transport compounds used in the photoconductive recording materials described in our co-pending European patent applications Nos. 88201293.3, 88201292.5 and 88201332.9.

In some cases it may be advantageous to use a plasticizing agent in the charge generating and/or charge transporting layer, e.g. halogenated paraffin, polyphenyl chloride, dimethylnaphthalene or dibutyl phthalate.

In the recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminum oxide layer acting as blocking layer preventing positive or negative charge injection from the support side. The thickness of said barrier layer is preferably not more than 1 micron ($\mu$m).

The conductive support may be made of any suitable conductive material. Typical conductors include aluminum, steel, brass and paper and resin materials incorporating or coated with conductivity enhancing substances, e.g. vacuum-deposited metal, dispersed carbon black, graphite and conductive monomeric salts or a conductive polymer, e.g. a polymer containing quaternized nitrogen atoms as in Calgon Conductive polymer 261 (trade mark of Calgon Corporation, Inc., Pittsburgh, Pa., U.S.A.) described in U.S. Pat. No. 3,832,171.

The support may be in the form of a foil, web or be part of a drum.

An electrophotographic recording process according to the present invention comprises the steps of:

(1) overall negatively electrostatically charging, e.g. with corona-device, the charge transporting layer or charge generating layer of a recording material of the present invention, (2) image-wise photo-exposing the charge generating layer of said recording material thereby obtaining a latent electrostatic image.

The photo-exposure of the charge generating layer proceeds preferably through the charge transporting layer but may be direct if the charge generating layer is uppermost or may proceed likewise through the conductive support if the latter is transparent enough to the exposure light.

The development of the latent electrostatic image commonly occurs preferably with finely divided electrostatically attractable material, called toner particles that are attracted by coulomb force to the electrostatic charge pattern. The toner development is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive image relationship to the original. In the latter case the areas discharged by photo-exposure obtain by induction through a properly biased developing electrode a charge of opposite charge sign with respect to the charge sign of the toner particles so that the toner becomes deposited in the photo-exposed areas that were discharged in the imagewise exposure (ref.: R. M. Schaffert "Electrophotography"—The Focal Press—London, New York, enlarged and revised edition 1975, p. 50-51 and T. P. Maclean "Electronic Imaging" Academic Press—London, 1979, p. 231).

According to a particular embodiment electrostatic charging, e.g. by corona, and the imagewise photo-exposure proceed simultaneously.

Residual charge after toner development may be dissipated before starting a next copying cycle by overall exposure and/or alternating current corona treatment.

The toner image obtained may be fixed onto the recording material or may be transferred to a receptor material to form thereon after fixing the final visible image.

Recording materials according to the present invention showing a particularly low fatigue effect can be used in recording apparatus operating with rapidly following copying cycles including the sequential steps of overall charging, imagewise exposing, toner development and toner transfer to a receptor element.

The evaluations of electrophotographic properties determined on the recording materials of the following examples relate to the performance of the recording materials in an electrophotographic process with a reusable photoreceptor. The measurements of the performance characteristics were carried out as follows:

The photoconductive recording sheet material was mounted with its conductive backing on an aluminium drum which was earthed and rotated at a circumferential speed of 10 cm/s. The recording material was sequentially charged with a negative corona at a voltage of $-4.6$ kV operating with a corona current of about 1 $\mu$A per cm of corona wire. Subsequently the recording material was exposed (simulating image-wise exposure) with a light dose corresponding to 19.0 mJ/m2 of 540 nm light or 13.2 mJ/m2 of 650 nm light obtained from a monochromator positioned at the circumference of the drum at an angle of 45° with respect to the corona source. The photo-exposure lasted 200 ms. Thereupon, the exposed recording material passed an electrometer probe positioned at an angle of 180° with respect to the corona source.

After effecting an overall post-exposure with a halogen lamp producing 27.000 mJ/m2 positioned at an angle of 270° with respect to the corona source a new copying cycle started.

Each measurement relates to 100 copying cycles in which 10 cycles without light exposure are alternated with 5 cycles with light exposure.

The charging level (CL) is taken as the average charging level over the 90th to 100th cycle, the residual potential (RP) as the residual potential over the 85to 90th cycle, the % discharge as $$\frac{(CL - RP)}{CL} \times 100$$

and the fatigue (F) as the difference in residual potential in volts between RP and the average residual potential over the 10th to 15th cycle.

For a given corona voltage, corona current, separating distance of the corona wires to recording surface and drum circumferential speed the charging level CL is only dependent upon the thickness of the charge transport layer and its specific resistivity. In practice CL expressed in volts should be preferably $\geq 30$ d, where d is the thickness in $\mu$m of the charge transport layer.

Under the applied exposure conditions, simulating practical copying conditions, using a charge transport layer in conjunction with a charge generating layer the % discharge should be at least 35% and preferably at least 50%. The fatigue F should preferably not exceed 20 V either negative or positive to maintain a uniform image quality over a large number of copying cycles.

The following examples further illustrate the present invention. All ratios and percentages mentioned in the Examples are by weight.

EXAMPLE 1

A photoconductor sheet was produced by coating a 100 μm thick polyester film vapour-coated with a conductive layer of aluminium with a dispersion of charge generating pigment to a thickness of 0.55 μm with a doctor-blade coater.

Said dispersion was prepared by mixing 1 g of trisazo dye 4 from the Table, 0.1 g of a polyester adhesion promoting agent DYNAPOL L 206 (registered trade mark), 0.9 g of MAKROLON CD 2000 (registered trade mark) and 18 g of dichloromethane for 16 h in a ball mill, which dispersion before coating was diluted with 8.6 g of dichloromethane to obtain the required coating viscosity.

The applied layer was dried for 15 minutes at 80° C. and then overcoated using a doctor-blade coater to a thickness of 14 μm with a filtered solution of charge transport substance and binder consisting of 2 g of the diphenyl hydrazone of 4-N,N-diethylaminobenzaldehyde, 2 g of MAKROLON CD 2000 (registered trade mark) and 26.6 g of dichloromethane. This layer was then dried for 16 h at 40° C.

The characteristics of the thus obtained photoconductive recording material were determined with a light dose of 19.0 mJ/m2 of 540 nm light as described above with the following results:
CL= −537 V
RP= −128 V
% discharge=76.2
F= −71 V

EXAMPLE 2

A photoconductive recording sheet was produced as described in Example 1 except that the charge transport layer consisted of 50% of the diphenylhydrazone of 3-formyl-N-ethyl-carbazole in MAKROLON CD 2000 (registered trade mark).

The characteristics of the thus obtained photoconductive recording material were determined with a light dose of 19.0 mJ/m2 of 540 nm light as described above with the following results:
CL= −525 V
RP= −62 V
% discharge=88.2%
F= +16 V

EXAMPLE 3

A photoconductive recording sheets was produced as described in Example 1 except that the charge transport layer consisted of 50% of N,N'bis(3-methylphenyl)-N,N'diphenyl-1,1'bisphenyl-4,4'diamine in MAKROLON CD 2000 (registered trade mark).

The characteristics of the thus obtained photoconductive recording material were determined with a light dose of 19.0 mJ/m2 of 540 nm light as described above with the following results:
CL:−551 V
RP:−44 V
% discharge=92.0%
F:+3 V

EXAMPLE 4

A photoconductive recording sheet was produced as described in Example 1 except that the charge transport layer consisted of 50% of 1,3,5tris(4-N,N-diethylaminophenyl)benzene in MAKROLON CD 2000 (registered trade mark).

The characteristics of the thus obtained photoconductive recording material were determined with a light dose at 19.0 mJ/m2 of 540 nm light as described above with the following results:
CL:−448 V
RP:−203 V
% discharge=54.7%
F:+26 V

EXAMPLE 5

A photoconductive recording sheet was produced as described in Example 1 except that the charge transport layer consisted of 50% of 1,2-bis(1,2-dihydro-2,2,4-trimethylquinolin-1-yl)ethane in MAKROLON CD 2000 (registered trade mark).

The characteristics of the thus obtained photoconductive recording material were determined with a light dose of 19.0 mJ/m2 of 540 nm light as described above with the following results:
CL= −707 V
RP= −386 V
% discharge=45.4%
F= +1 V

EXAMPLES 6

A photoconductive recording sheets was produced as described in Example 1 except that the pigment in the charge generation layer was pigment 1 from the table and the charge transport layer consisted of 50% of 1,2-bis(1,2-dihydro-2,2,4-trimethyl-quinolin-1-yl)ethane in MAKROLON CD 2000 (registered trade mark).

The characteristics of the thus obtained photoconductive recording material were determined with a light dose of 19.0 mJ/m2 of 540 nm light as described above with the following results:
CL:−609 V
RP:−359 V
% discharge=41.0%
F:+9 V

EXAMPLE 7

A photoconductive recording sheet was produced as described in Example 1 except that trisazo dye 4 in the charge generating layer was replaced in the same amount by trisazo dye 2 of the Table and the charge transporting layer consisted of 50% of 1,2-bis(1,2-dihydro-2,2,4-trimethyl-quinolin-1-yl)ethane in MAKROLON CD 2000 (registered trade mark).

The characteristics of the thus obtained photoconductive recording material were determined with a light dose at 19.0 mJ/m2 of 540 nm light as described above with the following results:
CL:−314 V
RP:−114 V
% discharge=63.7%
F:−38 V

EXAMPLE 8

A photoconductive recording sheet was produced as described in Example 1 except that trisazo dye 4 in the charge generating layer was replaced in the same amount by trisazo dye 8 of the Table and the charge transporting layer consisted of 50% of 1,2-bis(1,2-dihydro-2,2,4-trimethyl-quinolin-1-yl)ethane in MAKROLON CD 2000 (registered trade mark).

The characteristics of the thus obtained photoconductive recording material were determined with a light dose at 13.2 mJ/m2 of 650 nm light as described above with the following results:
CL: −765 V
RP: −616 V
% discharge:19.5
F:+38 V

EXAMPLE 9

A photoconductive recording sheet was produced as described in Example 1 except that trisazo dye 4 in the charge generating layer was replaced in the same amount by trisazo dye 12 of the Table and the charge transporting layer consisted of 50% of 1,2-bis(1,2-dihydro-2,2,4-trimethyl-quinolin-1-yl)ethane in MAKROLON CD 2000 (registered trade mark).

The characteristics of the thus obtained photoconductive recording material were determined with a light dose at 19.0 mJ/m2 of 540 nm light as described above with the following results:
CL: −796 V
RP: −734 V
% discharge:7.8
F:+50 V

We claim:

1. An electrophotographic recording material comprising a conductive support and a photosensitive layer containing in a resin binder a photoconductive compound that has p-type charge generating capacity and is a trisazo compound which is the reaction product of the coupling reaction between a coupler compound that does not contain a carboxylic acid or sulphonic acid group and a diazonium salt represented by the following general formula (I):

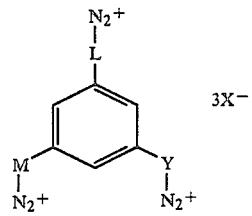

wherein: each of L, M and Y (same or different) represents a phenylene group including a phenylene groups substituted with one or more substituents selected from the group consisting of lower alkyl ($C_1$—$C_2$), nitro, methoxy, ethoxy or halogen, or represents said phenylene group fused-on with the necessary atoms to close a saturated or unsaturated carbocyclic or heterocyclic ring or ring system including said ring or ring-system in substituted form, and X$^-$ is an anion.

2. An electrophotographic recording material according to claim 1, wherein said electrically conductive support has thereon a charge generating layer in contiguous relationship with a charge transporting layer and said charge generating layer contains a trisazo compound as defined in claim 1.

3. An electrophotographic recording material according to claim 1, wherein the trisazo compound is prepared by a coupling reaciton wherein a coupler is used according to one of the following general formulae (II), (III), (IV), (V) and (VI):

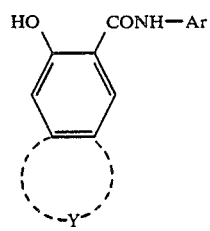

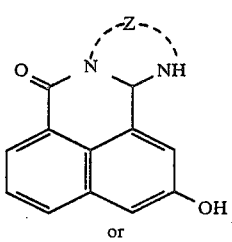

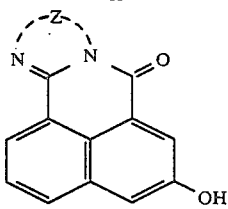

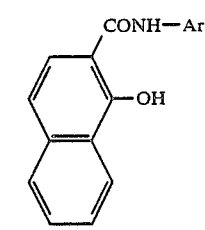

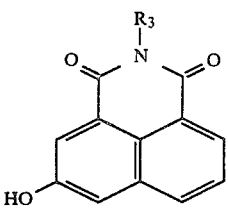

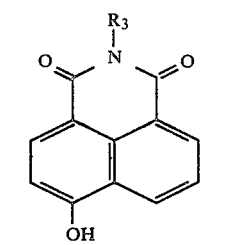

wherein:
Y represents the necessary atoms to close an aromatic carbo- or heterocyclic ring or ring system including said ring or ring system in substituted form,
Ar represents a phenyl group including a phenyl group further substituted with one or more substituents selected from the group consisting of lower alkyl ($C_1$-$C_2$), nitro, methoxy, ethoxy or halogen, or represents said phenyl group fused-on with the necessary atoms to close a saturated or unsaturated carbocyclic or heterocyclic ring or ring system including said ring or ring system in substituted form, Z represents the necessary atoms to close a heterocyclic ring or ring system including said ring or ring system in substituted form, and $R^3$ is an alkyl, aralkyl or aryl group.

4. An electrophotographic recording material according to claim 1, wherein the photoconductive compound is a triazo dye obtained by coupling reaction of a diazonium salt and therewith associated coupler in the following Table:

TABLE

| Trisazo dye | Diazonium salt | Coupler |
| --- | --- | --- |
| 1. | 1,3,5-tris(4-diazoniumphenyl)benzene | 3-hydroxy-N-phenyl-2-naphthamide |
| 2. | 1,3,5-tris(4-diazoniumphenyl)benzene | 3-hydroxy-N-(3-nitrophenyl)-2-naphthamide |
| 3. | 1,3,5-tris(4-diazoniumphenyl)benzene | 3-hydroxy-N-(2-methylphenyl)-2-naphthamide |
| 4. | 1,3,5-tris(3-diazoniumphenyl)benzene | 3-hydroxy-N-phenyl-2-naphthamide |

TABLE-continued

| Trisazo dye | Diazonium salt | Coupler |
|---|---|---|
| 5. | 1,3,5-tris(3-diazoniumphenyl)benzene tri-salt | 3-hydroxy-N-(3-nitrophenyl)-2-naphthamide |
| 6. | 1,3,5-tris(3-diazoniumphenyl)benzene tri-salt | 3-hydroxy-N-(2-methylphenyl)-2-naphthamide |
| 7. | 1,3,5-tris(4-diazoniumphenyl)benzene tri-salt | 3-hydroxy-N-phenyl-8-(2-methylphenylamino)-2-naphthamide (with 2-methylphenyl substituent) |
| 8. | 1,3,5-tris(4-diazoniumphenyl)benzene tri-salt | 3-hydroxy-N-(4-methoxyphenyl)-8-(2-methylphenylamino)-2-naphthamide |

TABLE-continued

| Trisazo dye | Diazonium salt | Coupler |
|---|---|---|
| 9. | 1,3,5-tris(4-diazoniumphenyl)benzene trihalide | 3-hydroxy-N-(2-methylphenyl)-2-naphthamide derivative with (2-methylphenyl)amino and (2-methylphenyl) substituents |
| 10. | 1,3,5-tris(4-diazoniumphenyl)benzene trihalide | 3-hydroxy-N-(3-nitrophenyl)-2-naphthamide derivative with (2-methylphenyl)amino and (2-methylphenyl) substituents |
| 11. | 1,3,5-tris(3-diazoniumphenyl)benzene trihalide | 3-hydroxy-N-phenyl-2-naphthamide derivative with (2-methylphenyl)amino and (2-methylphenyl) substituents |
| 12. | 1,3,5-tris(3-diazoniumphenyl)benzene trihalide | 3-hydroxy-N-(4-methoxyphenyl)-2-naphthamide derivative with (2-methylphenyl)amino and (2-methylphenyl) substituents |

| Trisazo dye | Diazonium salt | Coupler |
|---|---|---|
| 13. | | |
| 14. | | |

5. An electrophotographic recording material according to claim 2, wherein said photoconductive compound is present in said charge generating layer adhering directly to a conductive support.

6. An electrophotographic recording material according to claim 5, wherein the resin binder or binders is (are) selected from the group consisting of a cellulose ester, acrylate and methacrylate resins, polyvinyl chloride, copolymers of vinyl chloride, polyester resins, aromatic polycarbonate resins, silicone resins, polystyrene and copolymers of styrene and maleic anhydride, copolymers of butadiene and styrene, poly-N-vinylcarbazole and copolymers of N-vinylcarbazole having a N-vinylcarbazole content of at least 40% by weight.

7. An electrophotographic recording material according to claim 2, wherein the content of said photoconductive compound in the charge generating layer is in the range of 30 to 70 by weight with respect to the total weight of said layer.

8. An electrophotographic recording material according to claim 2, wherein the thickness of said charge generating layer is less than 5 μm.

9. An electrophotographic recording material according to claim 2, wherein the thickness of said charge transporting layer is in the range of 5 to 50 μm.

10. An electrophotographic recording material according to claim 2, wherein in the recording material an adhesive layer or barrier layer is present between the charge generating layer and the support and the thickness of said barrier is not more than 1 micron.

11. An electrophotographic recording material according to claim 1, wherein the conductive support is made of aluminium, steel, brass or paper or resin material incorporating or being coated with a conductivity enhancing substance, the support being in the form of a foil, web or being part of a drum.

* * * * *